United States Patent [19]

Godshalk et al.

[11] 3,935,147

[45] Jan. 27, 1976

[54] AQUEOUS PATTERN PAINT FROM CARBOXYLIC RESIN, N-ALDEHYDE RESIN, POLYSILOXANE RESIN AND FLUOROCARBON SURFACTANT

[75] Inventors: Henry W. Godshalk, Aurora, Ill.; Mohinder Paul Sharma, Wyoming, Mich.

[73] Assignee: Henry W. Godshalk, Batavia, Ill.

[22] Filed: Mar. 18, 1974

[21] Appl. No.: 451,883

[52] U.S. Cl. .................. 260/29.4 R; 260/29.2 M; 260/29.4 UA; 260/31.2 N; 260/33.2 R; 260/33.4 SB; 260/39 M; 260/826; 428/141
[51] Int. Cl.[2] ............... B44D 5/00; C08L 83/04
[58] Field of Search ......... 260/29.4 R, 29.2 M, 826, 260/29.4 UA; 117/37 R

[56] References Cited

UNITED STATES PATENTS

| | | | |
|---|---|---|---|
| 2,891,920 | 6/1959 | Hyde et al. | 260/29.2 M |
| 3,492,374 | 1/1970 | LeBleu et al. | 260/950 |
| 3,668,276 | 6/1972 | Riemhofer et al. | 260/29.4 R |

*Primary Examiner*—Murray Tillman
*Assistant Examiner*—A. H. Koeckert

[57] ABSTRACT

A coating composition for providing a pattern or texture finish which is formulated of an aqueous dispersion of a resinous vehicle in a cross-linking agent for the vehicle, a fluorocarbon surfactant and a high molecular weight polysiloxane resin.

11 Claims, No Drawings

AQUEOUS PATTERN PAINT FROM CARBOXYLIC RESIN, N-ALDEHYDE RESIN, POLYSILOXANE RESIN AND FLUOROCARBON SURFACTANT

This invention relates to coating compositions, and more particularly to paint compositions capable of providing a pattern or texture finish.

One group of industrial baking enamels currently in widespread use for application to fabricated metal substrates, such as furniture, tool boxes, appliances and the like, is the group of so-called pattern or texture finishes. While such paints or finishes can be characterized as novelty finishes, their popularity is primarily due to the fact that they have the ability to mask or hide defects in the substrate to which they are applied and still provide the desired protective and decorative effects. Pattern finishes are presently available only in conventional solvent based paints and are formulated by incorporating a small amount of a silicone resin in the paint composition. Such silicone resins have been used as paint additives for quite some time. The low molecular weight silicone resins are used to promote smoothness and eliminate defects in the applied paint film; they apparently exert their effect primarily through surface tension. High molecular weight silicone resins, on the other hand, can have the opposite effect and cause unevenness in the film, craters or a pattern.

One of the principal difficulties with existing pattern paint compositions is that such compositions are formulated with aromatic solvents, such as xylol or toluol. It has been determined that such aromatic solvent systems are photochemically reactive in the atmosphere to produce smog. As a result, many paint compositions formulated with such aromatic solvents fail to meet some of the more stringent anti-pollution measures in effect or proposed by various states. Therefore, paint compositions formulated with such aromatic solvents are frequently referred to as non-exempt solvent paints and can only be used under certain controlled circumstances.

It is an object of the present invention to overcome the foregoing disadvantages of existing pattern paint compositions, and it is a more specific object of the present invention to provide a pattern paint composition formulated without such aromatic solvents which is capable of providing the desired pattern or texture finish.

In particular, the present invention provides a paint composition formed of a water base to thereby meet air pollution regulations which is capable of providing an attractive, durable pattern or texture finish.

It is another object of the present invention to provide a pattern paint composition which can be formulated with exempt solvent systems to meet current air pollution regulations.

The concepts of the present invention reside in a pattern paint composition which is formulated of an aqueous dispersion of a resinous vehicle in combination with a cross-linking agent for the vehicle, a fluorocarbon surfactant and a high molecular weight polysiloxane resin. It has been found that water based pattern paint compositions can be formulated with a resinous vehicle and a polysiloxane resin to provide a pattern finish only if the paint composition is formulated to include a fluorocarbon surfactant. Without limiting the present invention as to theory, it has been hypothesized that the high molecular weight silicone resin is ineffective in the absence of a fluorocarbon surfactant due to the inherent high surface tension of water as compared with aromatic solvents of the type previously employed.

In the practice of the present invention, use can be made of a number of conventional resinous vehicles commonly employed in paint compositions. For example, one group of preferred resins are polyester resins which can be solubilized in water by means of ammonia or secondary and tertiary lower alkyl amines. One such resin which has been particularly well suited for use in the practice of the present invention is the alkyd resin marketed by Ashland Chemical Company under the trademark "AROLON 376". This resin is sold as a dispersion of 50% solids in water in combination with other volatile components, specifically t-butanol and the monobutyl ether of ethylene glycol. Resins of this type can be solubilized with ammonia or secondary and tertiary lower alkyl amines, such as trimethylamine, triethylamine, tripropylamine, diethylamine, dipropylamine, dibutylamine, etc.

Alternatively, use can also be made of water reducible resins. One such resin is "AROLON 465" marketed by Ashland Chemical Company. This particular resin system is marketed as a 70% solid dispersion in water and the monobutyl ether of ethylene glycol. In addition to alkyd resins and polyester resins, the vehicle employed in the practice of this invention may also be a polyacrylic acid resin which is similarly water reducible in the presence of ammonia or secondary and tertiary amines as described above. One suitable resin for this purpose is "AROLON 557" also marketed by Ashland Chemical Company.

The foregoing resinous vehicles all contain free carboxy groups and thus can be cross-linked with water soluble amine resin cross-linking agents. As the cross-linking agent, use can be made of a number of water-soluble amine resin cross-linking agents; preferred are low molecular weight melamine formaldehyde and urea formaldehyde resins. For example, use can be made as the cross-linking agent, of a methylated melamine formaldehyde resin marketed by American Cyanamid under the trademark "CYMEL 371". This resin system is marketed in the form of a dispersion of the resin in an alkanol solution, such as isobutanol or isopropanol. As is known to those skilled in the art, such cross-linking agents are capable of undergoing cross-linking with alkyd resins, polyester resins and polyacrylic acid resins such as those described above, without the necessity of employing a curing catalyst. The cross-linking agent may be alkylated although this is not essential to the practice of this invention. The effect of formulating the vehicle employed in the practice of this invention with one of the foregoing resins in combination with an amine resin cross-linking agent is to provide a vehicle capable of undergoing cure to provide a thermosetting coating having outstanding gloss and gloss retention.

The silicone resins employed in the practice of this invention are preferably high molecular weight silicone resins containing the disiloxane functional group

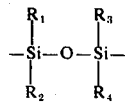

wherein $R_1$, $R_2$, $R_3$ and $R_4$ are each selected from the group consisting of alkyl containing 1 to 5 carbon atoms (e.g., methyl, ethyl, propyl, etc.), cycloalkyl containing 4 to 7 carbon atoms (e.g., cyclobutyl, cyclopentyl, cyclohexyl, etc.), and phenol and substituted phenol groups. In general, the polysiloxane resins employed in the practice of this invention should have a molecular weight sufficiently hight to assure the formation of a pattern in the paint composition as it is applied to the desired substrate. For this purpose, the molecular weight of the polysiloxane resin should exceed 2000 and preferably 3000. Such silicone paint additives are themselves well known and commercially available. Preferred is the silicone resin marketed by Union Carbide as "S-70" which is a high molecular weight dimethyl silicone resin. Other resins can be employed, including Union Carbide resins S-30 and S-40, both of which are high molecular weight resin systems.

As used herein, the term "fluorocarbon surfactant" is intended to refer to and include organic surfactants containing a fluorocarbon chain having the formula

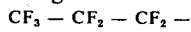
$$CF_3 - CF_2 - CF_2 -$$

The fluorocarbon surfactant can be anionic, cationic, nonionic or amphoteric. For example, one suitable anionic surfactant is a fluoroalkylsodium sulfate surfactant which is anionic. Such fluorocarbon surfactants are well known to those skilled in the art and are commercially available. Included in such surfactants is the surfactant marketed by 3M Company as "FC-430", the fluorocarbon surfactant of DuPont marketed as "TLF-3141" and the "ZONYL" fluorocarbon surfactants of DuPont. Of the latter group, use can be made of a series of fluorocarbon surfactants including ZONYL FSA or ZONYL FSP, both of which are anionic surfactants, ZONYL FSN which is a nonionic fluorocarbon surfactant, and ZONYL FSB which is an amphoteric fluorocarbon surfactant.

The relative proportions of the paint composition of the present invention are not critical to the practice of this invention and can generally be varied within wide limits. When the cross-linking agent is employed in an amount within the range of 10 to 70% by weight, and preferably 25 to 50% by weight, based upon the weight of the polyester, ammonia or an aliphatic amine is employed to solubilize the resin in the aqueous dispersion and the amount of the ammonia or amine employed is preferably an amount sufficient to adjust the pH of the overall composition to within the range of 7.5 to 9.5. Generally, an amount of the ammonia or amine within the range of 0.1 to 5.0% by weight based upon the weight of the resinous vehicle is sufficient for this purpose.

The amount of the siloxane resin and the surfactant is generally based upon the amount of the resinous vehicle present. Best results are usually achieved when the composition of the invention contains 0.01 to 5.0% by weight of the silicone resin based upon the total solids of the composition, and the amount of the fluorosurfactant is within the range of 0.05 to 5.0% by weight based upon the total solids of the paint composition. Water is employed to disperse the paint composition of this invention and the amount of water can be adjusted within wide limits to provide the desired solids content and viscosity. In general, it is preferred to employ water in an amount within the range of 10 to 90% by weight based upon the volume of the resin binder.

As will be understood by those skilled in the art, the paint composition of the present invention is also formulated to include the desired pigments. Any of a variety of conventional paint pigments may be used for this purpose, depending somewhat upon the intended use for the paint composition. Representative of such conventional paint pigment additives include aluminum flake pigments, phthalocyanine blue, benzidine yellow, and the like. The pigments should be employed in an amount sufficient to impart the desired coloration to the coating. Generally, the amount of pigment ranges from 5 to 60% by weight based upon the weight of the resinous vehicle present in the composition.

While not equivalent to the water-based paints as described above, it has been found that the paint compositions of the present invention can also be formulated with the so-called exempt solvent systems which are capable of of use free from air pollution regulation restrictions. As used herein, the term "exempt solvent systems" is intended to refer to and include aliphatic hydrocarbon solvents, such as mineral spirits, naphtha, commercially available liquid alkanes and the like aliphatic solvents in combination with alkanols containing 2 to 8 carbon atoms or esters prepared therefrom with lower aliphatic carboxylic acids, such as acetic acid, propionic acid, butyric acid, isobutyric acid, etc. In formulating paint compositions of the present invention with the foregoing exempt solvent systems, generally the same procedures and proportions as described above can be employed to provide a paint composition capable of providing a good texture or pattern finish.

Having described the basic concepts of the invention, reference is now made to the following examples which are provided by way of illustration, and not by way of limitation, of the practice of the invention.

EXAMPLE 1

This example illustrates the preparation of a water base composition embodying the features of the present invention.

A pre-mix of 2.5 g of an aluminum flake pigment (Alcoa 726) in 27 g of n-propanol is added to the following composition:

| | |
|---|---|
| Butyl ether of ethylene glycol | 14.0 g |
| Alkyd resin - 50% solids (Arolon 376 - Ashland Chemical Co.) | 214.0 g |
| Methylated melamine-formaldehyde cross-linking agent (Cymel 371 - American Cyanamid) | 54.5 g |
| Triethyl amine | 4.0 g |
| Phthalocyanine Blue pigment dispersion in Arolon 376 | 21.0 g |
| Water | 50.0 g |

For convenience, the pigment is dispersed in the vehicle. The resulting solution is agitated, and there is added 1.25 g (0.7% based on total solids) of a dimethylsiloxane resin (S-70 from Union Carbide) and 3.5 g g (2% based on total solids) of a fluoroalkyl sodium sulfate surfactant (TLF-3141 from DuPont).

After agitation, the resulting composition was sprayed on a steel panel and baked. An excellent hammertone pattern finish was obtained.

EXAMPLE 2

Using the procedure described in Example 1, a premix of 7.5 g of aluminum flake pigment (Alcoa 726) in 13.5 g of n-propanol is added, with agitation, to the following:

| | |
|---|---|
| Alkyd resin (Arolon 376 - 50% solids) | 107.5 g |
| Methylated melamine-formaldehyde cross-linking agent (Cymel 371) | 27.0 g |
| Butyl ether of ethylene glycol | 7.0 g |
| Triethyl amine | 2.0 g |
| Phthalocyanine Blue pigment dispersion | 55.0 g |
| Water | 25.0 g |

To the resulting mixture there is added 3.0 g of dimethyl siloxane resin (3% based on total solids) and 0.15 g (0.1% based on total solids) of a nonionic fluorocarbon surfactant Zonyl FSN by DuPont.

EXAMPLE 3

Using the same procedure and components as described in Example 2, a paint composition was formulated, except that the amount of Zonyl FSN, the nonionic fluorosurfactant, was increased to 1% by weight based upon the total solids content of the paint. On application to a metal substrate by spraying, an excellent pattern was obtained on the baked substrate.

EXAMPLE 4

Using the same procedure as described in Example 2, a paint composition was formulated except that the fluorocarbon surfactant was FC-430 marketed by 3M Company. The fluorocarbon surfactant was employed in an amount of 1% by weight based upon the total solids content of the composition. Comparable results were obtained.

EXAMPLE 5

A pre-mix of 14 g of an aluminum flake pigment (Alcoa 726) dispersed in n-propanol (27 g) is added to a mixture of the following components with agitation:

| | |
|---|---|
| Alkyd resin vehicle (Arolon 376) | 214.5 g |
| Methylated melamine-formaldehyde resin cross-linking agent (Cymel 371) | 54.5 g |
| Monobutyl ether of ethylene glycol | 13.5 g |
| Triethyl amine | 4.0 g |
| Magnesium silicate pigment | 21.0 g |
| Phthalocyanine Blue pigment dispersion | 21.0 g |
| Water | 50.0 g |

To the resulting mixture there is added 0.80 g (0.5% by weight based on the total solids) of dimethylpolysiloxane and 3.50 g of the fluorocarbon surfactant Zonyl FSN.

On application of the paint composition to a metal substrate and subsequent baking, an excellent pattern finish was obtained.

It is sometimes desirable to formulate the paint composition of the present invention such that the cross-linking reaction between the resinous vehicle and the amine resin cross-linking agent can take place at ambient temperatures. For this purpose, the paint composition can be, if desired, formulated with a catalyst capable of promoting the cross-linking reaction. Such catalysts are of themselves well known and are generally acid catalysts, preferably formed of a heavy metal salt of an organic acid, such as lead naphthenate, cobalt naphthenate, nickel naphthenate or the like. A composition embodying this concept of the invention is shown below.

EXAMPLE 6

A pre-mix of 7.50 g of an aluminum flake pigment (Alcoa 726) dispersed in 13.5 g of n-propanol is added to the following composition:

| | |
|---|---|
| Alkyd resin vehicle (Arolon 376) | 107.0 g |
| Triethylamine | 1.07 g |
| Monobutyl ether of ethylene glycol | 7.0 g |
| Phthalocyanine Blue pigment dispersion | 55.0 g |

To the resulting mixture there is added 3.0 g of dimethylpolysiloxane, 0.17 g of a nonionic fluorocarbon surfactant (Zonyl FSN) along with 0.6 g of lead naphthenate and 0.4 g of cobalt naphthenate. On application of the resulting paint composition to a metal substrate, a good pattern was obtained after air drying of the paint film.

EXAMPLE 7

This example illustrates the use of a polyester resin as the paint vehicle.

A premix of 5.0 g of aluminum flake pigment (Alcoa 726) in 15 g of n-propanol is blended with the following mixture:

| | |
|---|---|
| Water reducible polyester resin (Arolon 465) | 80.0 g |
| Methylated melamine-formaldehyde cross-linking agent (Cymel 371) | 27.0 g |
| Triethylamine | 2.0 |
| Monobutyl ether of ethylene glycol | 7.0 |
| Phthalocyanine Blue pigment dispersion | 50.0 |
| Water | 20.0 |

To the resulting mixture there is added 3.0 g of the polysiloxene S-70 from Union Carbide and 1.75 g of Zonyl FSN. Comparable results are obtained.

EXAMPLE 8

This example illustrates the use of a water-reducible polyacrylic acid resin as the resinous vehicle in a composition of the present invention. Using the procedure described in Example 1, a paint composition is formulated of the following:

| | |
|---|---|
| Aluminum flake pigment | 7.5 g |
| n-Propanol | 15.0 g |
| Polyacrylic acid resin (Synthemul 90-588 of Reichhold Chemicals) | 90.0 g |
| Methylated melamine-formaldehyde cross-linking agent (Cymel 371) | 30.0 g |
| Triethylamine | 7.0 g |
| Monobutyl ether of ethylene glycol | 10.0 g |
| Phthalocyanine Blue pigment dispersion | 50.0 g |
| Dimethyl siloxane | 3.0 g |
| Fluorocarbon surfactant (Zonyl FSN) | 1.5 g |
| Water | 100.0 g |

After the mixture is agitated for about 5 minutes, the paint is sprayed on a steel panel and baked for 10 minutes at 350°F. A good pattern was obtained.

EXAMPLE 9

This example illustrates the formulation of a paint composition of the present invention in an exempt solvent system.

A premix of 7.5 g of an aluminum pigment (Aluminum Paste MD 588 from Alcan Metals) in 15 g of the monobutyl ether of ethylene glycol is added with stirring to a solution of 200 g of an alkyd resin 12-654 of Reichhold Chemicals, 40 g of a urea-formaldehyde resin U-963 from Monsanto, 30 g of n-butanol and 32 g of monobutyl ether of ethylene glycol. Thereafter, 5 g of a 25% solution of dimethyl siloxane (S-70 from Union Carbide) in xylol is added, followed by 1 g of fluorocarbon surfactant Zonyl FSN. On application to a steel panel, an attractive pattern finish was obtained and dried.

While the foregoing example embodies a small amount of an aromatic solvent system in the form of xylol, the amount of the xylol present is sufficiently low as to comply with current air pollution standards. Generally, if an aromatic solvent is embodied in the composition of this invention, it should be employed in an amount of less than 10% in order to insure the absence of photochemical reactants.

It will be understood that various changes and modifications in the details of procedure, formulation and use may be made without departing from the spirit of the invention, especially as defined in the following claims.

We claim:

1. A resinous composition for producing a pattern paint consisting essentially of an aqueous dispersion of (1) a water reducible resinous vehicle in which the resin is selected from the group consisting of a polyester resin containing carboxyl groups and a polyacrylic acid resin, (2) an amine-aldehyde or amide-aldehyde resin cross-linking agent for the resinous vehicle, (3) a fluorocarbon surfactant containing a group of the formula $CF_3-CF_2-CF_2-$ and (4) a polysiloxane resin having an average molecular weight of at least 2,000.

2. A composition as defined in claim 1 wherein the resinous vehicle is dispersable in water with a base added to the composition, said base being selected from the group consisting of ammonia and secondary or tertiary lower alkyl amines.

3. A composition as defined in claim 2 wherein the base is present in an amount sufficient to adjust the pH of the composition to within the range of 7.5 to 9.5.

4. A composition as defined in claim 1 wherein the cross-linking agent is selected from the group consisting of a melamine-formaldehyde resin, a urea-formaldehyde resin and alkylated derivatives thereof.

5. A composition as defined in claim 1 which also includes a catalyst to promote the cross-linking of the resinous vehicle by the cross-linking agent.

6. A composition as defined in claim 1 wherein the cross-linking agent is water-soluble methylated melamineformaldehyde resin.

7. A composition as defined in claim 1 wherein the cross-linking agent is present in an amount within the range of 10 to 70% by weight based upon the weight of the resinous vehicle.

8. A composition as defined in claim 1 wherein the fluorocarbon surfactant is present in an amount within the range of 0.05 to 5.0% by weight based upon the total solids content of the composition.

9. A composition as defined in claim 1 wherein the polysiloxane resin is present in an amount within the range of 0.01 to 5.0% by weight based upon the total solids content of the composition.

10. A pattern paint composition comprising the resinous composition as defined by claim 1 and at least one pigment.

11. A pattern paint composition consisting essentially of an aqueous dispersion of (1) a water reducible resinous vehicle in which the resin is selected from the group consisting of a polyester resin containing carboxyl groups and a polyacrylic acid resin, (2) an amine-aldehyde or amide-aldehyde resin cross-linking agent for the resinous vehicle, (3) a fluorocarbon surfactant containing a group of the formula $CF_3-CF_2-CF_2-$, (4) a polysiloxane resin having an average molecular weight of at least 2,000 and (5) at least one pigment.

* * * * *